US012766853B2

(12) United States Patent
Miyabe et al.

(10) Patent No.: US 12,766,853 B2
(45) Date of Patent: Oct. 20, 2026

(54) LIQUID DISCHARGE APPARATUS AND PRINTING METHOD

(71) Applicants: Yuka Miyabe, Kanagawa (JP); Masaaki Tsuda, Kanagawa (JP)

(72) Inventors: Yuka Miyabe, Kanagawa (JP); Masaaki Tsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 121 days.

(21) Appl. No.: 18/670,760

(22) Filed: May 22, 2024

(65) Prior Publication Data

US 2024/0391249 A1 Nov. 28, 2024

(30) Foreign Application Priority Data

May 23, 2023 (JP) ................................. 2023-084594

(51) Int. Cl.

*B41J 2/21* (2006.01)
*B41J 3/407* (2006.01)
*B41J 11/00* (2006.01)

(52) U.S. Cl.

CPC ............ *B41J 2/2117* (2013.01); *B41J 2/2114* (2013.01); *B41J 3/4078* (2013.01); *B41J 11/0024* (2021.01)

(58) Field of Classification Search

CPC ...... B41J 2/2117; B41J 2/2114; B41J 3/4078; B41J 11/0024

See application file for complete search history.

(56) References Cited

U.S. PATENT DOCUMENTS

| | | | | |
|---|---|---|---|---|
| 2012/0058285 | A1* | 3/2012 | Takemoto | B41M 3/12 427/152 |
| 2012/0224013 | A1* | 9/2012 | Liang | B41M 3/12 347/105 |
| 2013/0052291 | A1* | 2/2013 | Morikawa | B33Y 40/20 425/135 |
| 2016/0129702 | A1* | 5/2016 | Katagami | B41J 11/0015 347/102 |
| 2019/0283446 | A1 | 9/2019 | Tsuda | |
| 2021/0291551 | A1* | 9/2021 | Mataki | B41J 2/01 |
| 2024/0100841 | A1 | 3/2024 | Tsuda et al. | |

FOREIGN PATENT DOCUMENTS

| | | |
|---|---|---|
| JP | 2013-141787 A | 7/2013 |
| JP | 2024-049017 A | 4/2024 |

* cited by examiner

*Primary Examiner* — Yaovi M Ameh
(74) *Attorney, Agent, or Firm* — XSENSUS LLP

(57) ABSTRACT

A liquid discharge apparatus includes a first head, a second head, and a third head. The first head discharges a color ink onto a transfer substrate. The second head discharges a pretreatment liquid including a coagulant onto the transfer substrate onto which the color ink has been discharged by the first head. The third head discharges a white ink onto the transfer substrate onto which the pretreatment liquid has been discharged by the second head.

17 Claims, 5 Drawing Sheets

LIQUID DISCHARGE APPARATUS AND PRINTING METHOD

CROSS-REFERENCE TO RELATED APPLICATION

This patent application is based on and claims priority pursuant to 35 U.S.C. § 119(a) to Japanese Patent Application No. 2023-084594, filed on May 23, 2023, in the Japan Patent Office, the entire disclosure of which is hereby incorporated by reference herein.

BACKGROUND

Technical Field

Embodiments of the present disclosure relate to a liquid discharge apparatus and a printing method.

Related Art

As an image forming apparatus, a digital to film or direct to film (DTF) type printer is known in the art. The DTF type printer applies coloring ink to a substrate such as a film, and further applies a binder which may be referred to as an adhesive liquid or an adhesive. The applied coloring ink on the film is transferred to a recording medium such as a garment.

In addition, as an image forming apparatus other than the DTF type, a digital to garment or direct to garment (DTG) type printer is also known in the art. The DTG type printer directly forms an image on a recording medium such as a garment using, for example, color ink and white ink. In the DTG type, for example, after a pretreatment liquid is applied to the recording medium, the white ink is applied. Thus, the white ink is aggregated, and then the color ink is applied.

SUMMARY

Embodiments of the present disclosure describe an improved liquid discharge apparatus that includes first head, a second head, and a third head. The first head discharges a color ink onto a transfer substrate. The second head discharges a pretreatment liquid including a coagulant onto the transfer substrate onto which the color ink has been discharged by the first head. The third head discharges a white ink onto the transfer substrate onto which the pretreatment liquid has been discharged by the second head.

According to another embodiment of the present disclosure, there is provided a printing method including discharging a color ink onto a transfer substrate, discharging a pretreatment liquid including a coagulant onto the transfer substrate onto which the color ink has been discharged, and discharging a white ink onto the transfer substrate onto which the pretreatment liquid has been discharged.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
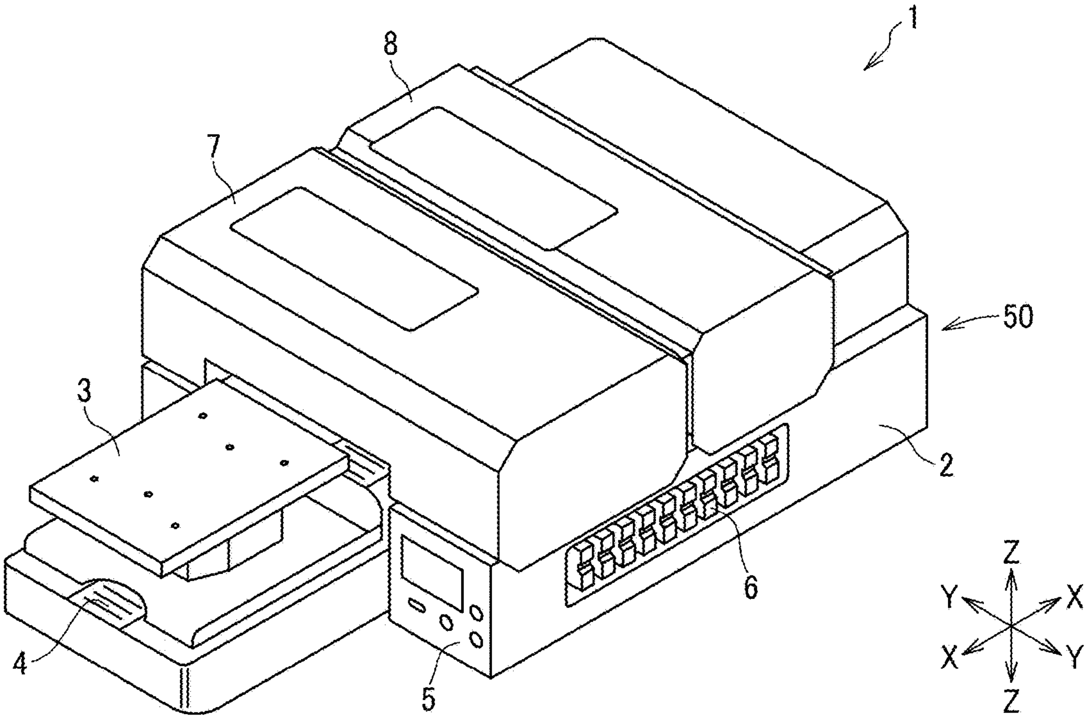
FIG. 1 is a perspective view of a liquid discharge apparatus according to an embodiment of the present disclosure, with covers closed.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A liquid discharge apparatus and a printing method according to embodiments of the present disclosure are described below with reference to the drawings.

Embodiments of the present disclosure are not limited to the embodiments described below and may be other embodiments than the embodiments described below. The following embodiments may be modified by, for example, addition, modification, or omission within the scope that would be obvious to one skilled in the art. Any aspects having advantages as described for the following embodiments according to the present disclosure are included within the scope of the present disclosure.

A liquid discharge apparatus according to an embodiment of the present disclosure can perform a first method of forming an image on a transfer substrate for transferring an image to a recording medium and a second method of forming an image on a recording medium. The liquid discharge apparatus includes a liquid discharge unit including a color ink, a white ink, a pretreatment liquid containing a coagulant, a binder liquid containing a resin, a nozzle for discharging the color ink, a nozzle for discharging the white ink, a nozzle for discharging the pretreatment liquid, and a nozzle for discharging the binder liquid. The liquid discharge unit discharges the pretreatment liquid when the first method is performed.

A printing method according to an embodiment of the present disclosure can perform a first method of forming an image on a transfer substrate for transferring an image to a recording medium and a second method of forming an image on a recording medium. The first method and the second method include a discharge process of discharging a color ink, a white ink, a pretreatment liquid containing a coagulant, and a binder liquid containing a resin by a liquid discharge unit. The discharge process includes discharging the pretreatment liquid when the first method is performed.

Figure 2:
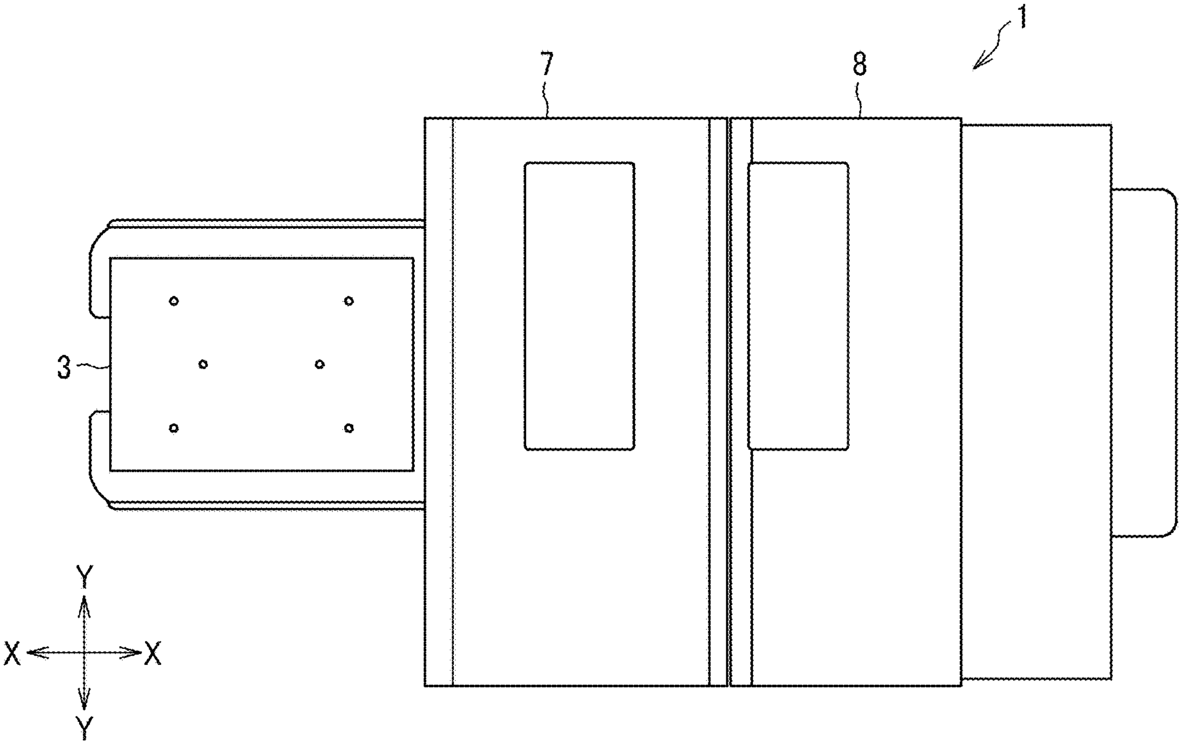
FIG. 2 is a plan view of the liquid discharge apparatus of FIG. 1.
Figure 3:
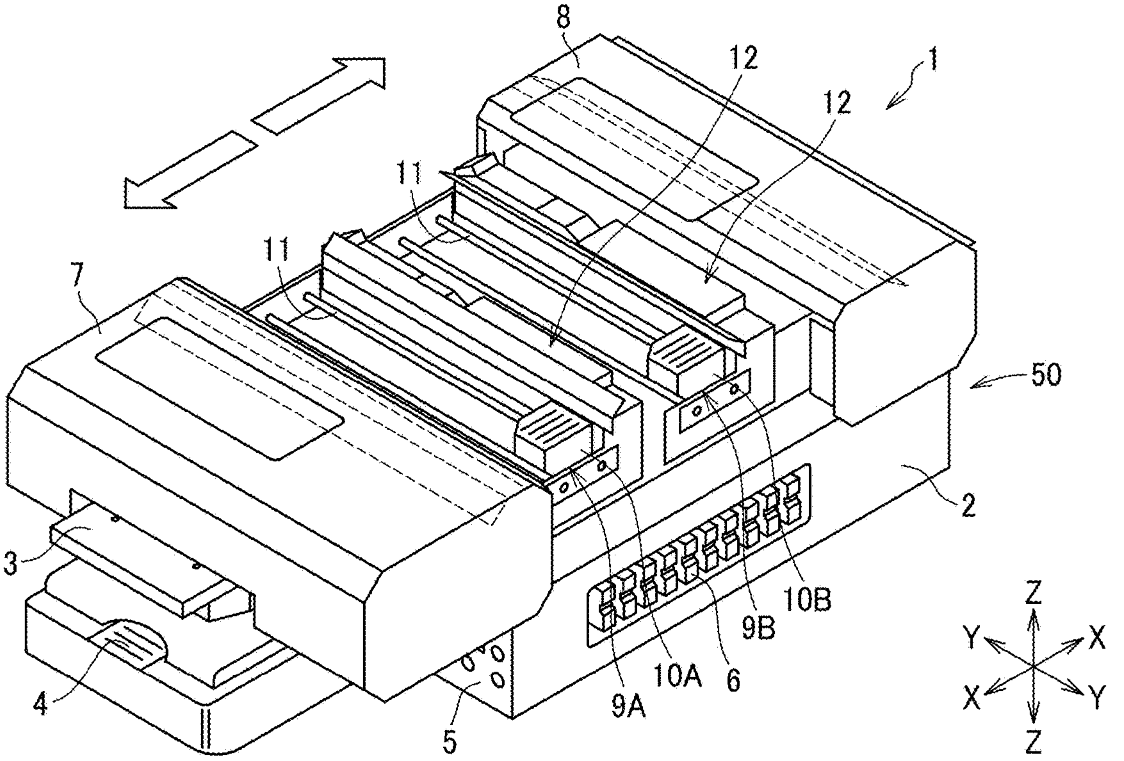
FIG. 3 is a perspective view of the liquid discharge apparatus of FIG. 1 with the covers open.
Figure 4:
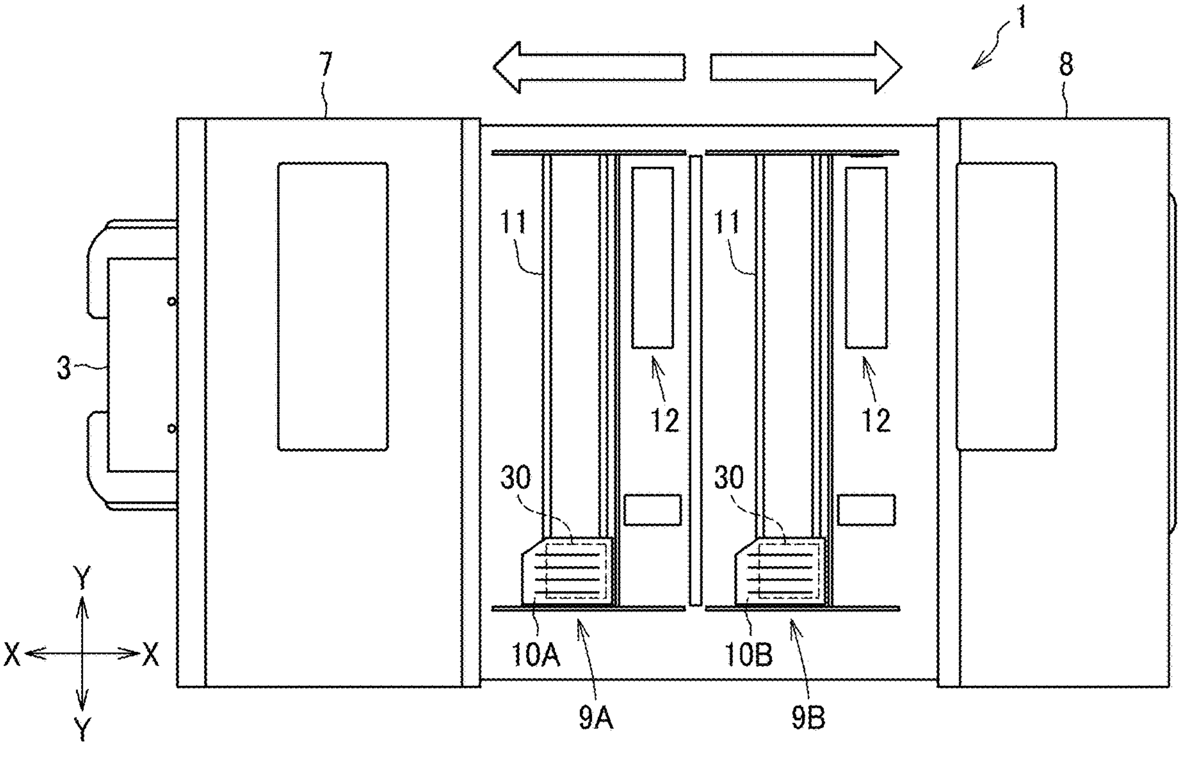
FIG. 4 is a plan view of the liquid discharge apparatus of FIG. 3.

FIG. 1 is a perspective view of a liquid discharge apparatus 1 according to an embodiment of the present disclosure, with covers closed, and FIG. 2 is a plan view thereof. FIG. 3 is a perspective view of the liquid discharge apparatus 1 with the covers open, and FIG. 4 is a plan view thereof. Directions X in FIG. 1 are the front-rear direction, sub-scanning direction, and recording-medium conveyance direction of the liquid discharge apparatus 1. Directions Y in FIG. 1 are the transverse direction and main scanning direction of the liquid discharge apparatus 1. Directions Z in FIG. 1 are the vertical directions of the liquid discharge apparatus 1. The directions X and the directions Y are parallel to a surface, onto which a liquid is discharged, of a substrate or a recording medium on a platen 3, but may have some error. The directions X, Y, and Z are orthogonal to each other. In FIG. 3, an illustration of a partition plate is omitted for the sake of convenience.

As illustrated in FIGS. 1 and 2, the liquid discharge apparatus 1 includes the platen 3 in front of a housing 2. The platen 3 may be referred to as a stage. The platen 3 is mounted on a guide rail 4. The guide rail 4 extends in the directions X. A control panel 5 is disposed on the front face of the housing 2. An ink cartridge 6 is detachably attached to a side face of the housing 2. A front cover 7 and a rear cover 8 as an opening-and-closing cover are disposed over the housing 2.

The platen 3 has a flat upper face on which the substrate or the recording medium is placed. The upper face of the platen 3 is parallel to the directions X and the directions Y. The platen 3 moves on the guide rail 4 to reciprocate in both the directions X. The platen 3 is movable up and down in the directions Z. Thus, the height of the substrate or the recording medium placed on the platen 3 is adjustable.

The liquid discharge apparatus 1 and the printing method according to the present embodiment can perform a first method of forming an image on a transfer substrate from which the image is to be transferred to a recording medium and a second method of forming an image on a recording medium. The first method includes printing by a digital to film or direct to film (DTF) method, and the second method includes printing by a digital to garment or direct to garment (DTG) method. In the following description, performing the first method may also be referred to as performing the DTF method, printing by the DTF method, or forming an image by the DTF method. Performing the second method may also be referred to as performing the DTG method, printing by the DTG method, or forming an image by the DTG method.

In the first method, a transfer substrate (may also be referred to simply as a substrate) such as a film is placed on the platen 3, and a liquid discharge unit discharges a liquid onto the substrate. In the second method, a recording medium such as a cloth is placed on the platen 3, and the liquid discharge unit discharges a liquid onto the recording medium.

The front cover 7 and the rear cover 8 are movable in both the directions X. In FIG. 1, the front cover 7 has been moved backward and the rear cover 8 has been moved forward to close the front cover 7 and the rear cover 8 (i.e., a closed position). On the other hand, in FIG. 3, the front cover 7 is moved forward and the rear cover 8 is moved backward to open the front cover 7 and the rear cover 8 (i.e., an open position).

As described above, the front cover 7 and the rear cover 8 are slidably opened and closed. As a result, an occupied space of the liquid discharge apparatus 1 including an opening and closing space of each of the front cover 7 and the rear cover 8 can be reduced as compared with a configuration in which a front cover and a rear cover are opened and closed in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 3 and 4, an apparatus body 50 of the liquid discharge apparatus 1 includes, for example, the housing 2 and liquid discharge units 9A and 9B mounted on the housing 2. In the present embodiment, specifically, the apparatus body 50 is a portion of the liquid discharge apparatus 1 other than the front cover 7 and the rear cover 8. The front cover 7 and the rear cover 8 are slidable in the directions X relative to the apparatus body 50.

The front cover 7 and the rear cover 8 are opened to expose the liquid discharge units 9A and 9B to the outside of the liquid discharge apparatus 1. When the liquid discharge units 9A and 9B are exposed to the outside, an operator can clean a maintenance unit 30, a liquid discharge head, and the surroundings thereof, or can replace carriages 10A and 10B. The front cover 7 and the rear cover 8 are closed during image formation. As a result, the liquid discharge units 9A and 9B are covered by the front cover 7 and the rear cover 8 to block access to operation units such as the carriages 10A and 10B of the liquid discharge units 9A and 9B from the outside.

The liquid discharge units 9A and 9B are disposed in the closed space in the front cover 7 or the rear cover 8. Accordingly, a mist of ink (liquid) is prevented from scattering to environs outside the liquid discharge apparatus 1 while the liquid discharge head discharges the ink to the recording medium (i.e., during liquid discharge operation). Further, the liquid discharge units 9A and 9B may include a fan to circulate an airflow in the front cover 7 or the rear cover 8 to collect the generated mist of the ink (i.e., ink mist) in the front cover 7 or the rear cover 8.

The liquid discharge apparatus 1 according to the present embodiment includes the two liquid discharge units 9A and 9B arranged side by side in the directions X. The configuration of the liquid discharge units 9A and 9B can be appropriately selected. For example, the liquid discharge unit 9A discharges color ink and white ink. For example, the liquid discharge unit 9B discharges a pretreatment liquid and a binder liquid. The configuration of the liquid discharge units 9A and 9B and the configuration of the carriages 10A and 10B are not limited thereto, and will be described later.

Since the liquid discharge units 9A and 9B have similar configurations, the liquid discharge unit 9A is described below. The liquid discharge unit 9A includes the carriage 10A, a guide rod 11, an electrical component unit 12, and the maintenance unit 30. The liquid discharge units 9A and 9B and the carriages 10A and 10B may be referred to simply as a liquid discharge unit 9 and a carriage 10, respectively, unless distinguished.

The guide rod 11 extends in the main scanning direction. The carriage 10 is movable in the main scanning direction along the guide rod 11. The carriage 10 includes multiple liquid discharge heads. The maintenance unit 30 is disposed at a position facing the guide rod 11 outside a liquid discharge region on one side in the transverse direction (directions Y).

The electrical component unit 12 includes, for example, a board and an electrical component cover covering the board. The electrical component unit 12 includes a controller that controls the liquid discharge operation.

The maintenance unit 30 includes, for example, a wiping member that cleans a nozzle face of the liquid discharge head and a suction mechanism that sucks the nozzle face. The wiping member may be a wiper made of, for example, rubber, or a web made of, for example, nonwoven fabric.

The process of forming an image by the liquid discharge head is described below.

In the printing by the DTG method, a recording medium is placed on the platen 3 and conveyed along the guide rail 4. The recording medium is conveyed to the rear side of the liquid discharge apparatus 1, and the pretreatment liquid is discharged onto the recording medium by the liquid discharge unit 9B. Specifically, while the carriage 10B moves in the main scanning direction along the guide rod 11, the liquid discharge unit 9B discharges the pretreatment liquid from the nozzles of the liquid discharge head onto the entire width of the recording medium in the main scanning direction. The discharge of the pretreatment liquid is repeated at multiple positions in the sub-scanning direction. As a result, the pretreatment liquid is applied to the entire recording medium. After that, the platen 3 moves forward, and the liquid discharge unit 9A discharges the white ink onto the recording medium, and then discharges the color ink onto the recording medium using a method similar to that of the liquid discharge unit 9B. Thus, an image is formed on the recording medium.

As described above, the liquid discharge apparatus 1 according to the present embodiment has the color ink, the white ink, and the pretreatment liquid similar to those of a DTG type printer according to a comparative example. Accordingly, the printing by the DTG method can be performed. In the DTG method, for example, after the pretreatment liquid is applied to the recording medium, the white ink is applied, and thus the white ink is aggregated. After that, the color ink is applied.

As described later, which of the liquid discharge unit 9A and the liquid discharge unit 9B discharges which of the color ink, the white ink, the pretreatment liquid, and the binder liquid can be appropriately changed. In addition, the number of liquid discharge units may be one, or three or more.

The liquid discharge apparatus 1 according to the present embodiment has a binder liquid used in the printing by the DTF method. Thus, the liquid discharge apparatus can print by the DTF method. In addition, the liquid discharge apparatus 1 and the printing method according to the present embodiment discharge the pretreatment liquid in the printing by the first method (including the DTF method).

In the printing by the DTF method, the pretreatment liquid is discharged to cause the white ink to be aggregated to prevent the white ink from bleeding into the layer of the color ink on the transfer substrate. In the present embodiment, a phenomenon in which the white ink bleeds into the layer of the color ink and the image is blurred in white can be prevented. Accordingly, a high quality image can be formed.

In the present embodiment, preferably, the color ink, the pretreatment liquid, the white ink, and the binder liquid are discharged in this order onto an image forming region of the transfer substrate when the first method is performed. The pretreatment liquid is discharged between the discharge of the color ink and the discharge of the white ink to cause the white ink to be aggregated to prevent the white ink from bleeding into the layer of the color ink.

The pretreatment liquid may be referred to as, for example, pretreatment ink. The binder liquid may be referred to as, for example, an adhesive liquid, an adhesive, or binder ink. Printing may be referred to as, for example, image formation or print. In addition, a layer formed by the color ink discharged onto the transfer substrate is referred to as, for example, a layer of color ink or a color ink layer. Similarly, layers formed by the white ink, the pretreatment liquid, and the binder liquid discharged onto the transfer substrate are also referred to as, for example, a layer of white ink or a white ink layer, a layer of pretreatment liquid or a pretreatment liquid layer, a layer of binder liquid or a binder liquid layer, respectively.

In the printing by the DTF method, a transfer substrate is placed on the platen 3 and conveyed along the guide rail 4. The liquid discharge unit 9A discharges the color ink of multiple colors onto the transfer substrate. The platen 3 moves backward, and the liquid discharge unit 9B discharges the pretreatment liquid onto the transfer substrate. Then, the platen 3 moves forward, and the liquid discharge unit 9A discharges the white ink onto the transfer substrate. Subsequently, the platen 3 moves backward, and the liquid discharge unit 9B discharges the binder liquid onto the transfer substrate.

Thus, an image is formed on the transfer substrate, and the transfer substrate on which the image is formed can be obtained. The transfer substrate on which an image is formed may be referred to as, for example, a transfer sheet. After the printing by the DTF method, a transfer process of transferring the image of the transfer sheet to a recording medium may be performed. The transfer substrate (transfer sheet) on which the image is formed may be cut if desired. The layer of the binder liquid formed on the transfer substrate is brought into contact with a recording medium to transfer the image formed on the transfer substrate to the recording medium. Thus, an image is formed on the recording medium such as a cloth.

As described above, in the present embodiment, the liquid discharge apparatus 1 can perform both the first method including the DTF method and the second method including the DTG method. For example, a controller of the liquid discharge apparatus 1 determines which method is performed and controls the liquid discharge unit in each method. The controller includes a central processing unit (CPU).

The liquid discharge unit discharges the color ink, the pretreatment liquid, the white ink, and the binder liquid in this order onto an image forming region of the transfer substrate in the first method, and discharges the pretreatment liquid, the white ink, and the color ink in this order onto an image forming region of the recording medium in the second method.

By so doing, in the printing by the DTF method, the white ink can be prevented from bleeding into the color ink. As a result, the image quality can be enhanced. In addition, in the printing by the DTG, the white ink can be aggregated by the pretreatment liquid, and thus the image quality can be enhanced. The image forming area will be described later with reference to, for example, FIG. 5.

In the printing method according to the present embodiment, the first method and the second method include a discharge process of discharging a color ink, a white ink, a pretreatment liquid containing a coagulant, and a binder liquid containing a resin by a liquid discharge unit. The discharge process includes discharging the pretreatment liquid when the first method is performed.

In the discharge process of the printing method according to the present embodiment, the color ink, the pretreatment liquid, the white ink, and the binder liquid are discharged in this order onto an image forming region of the transfer substrate when the first method is performed, and the pretreatment liquid, the white ink, and the color ink are discharged in this order onto an image forming region of the recording medium when the second method is performed.

By so doing, in the printing by the DTF method, the white ink can be prevented from bleeding into the color ink. As a result, the image quality can be enhanced. In addition, in the printing by the DTG, the white ink can be aggregated by the pretreatment liquid, and thus the image quality can be enhanced.

In the printing method according to the present embodiment, after the first method is performed, a transfer process of transferring the color ink and/or the white ink on the transfer substrate to the recording medium may be performed. In this case, in the transfer process, the binder liquid on the transfer substrate is brought into contact with the recording medium to transfer the color ink and/or the white ink on the transfer substrate to the recording medium. By so doing, in the printing by the DTF method, the white ink can be prevented from bleeding into the color ink. As a result, the image quality can be enhanced.

In the transfer process, heat is preferably applied to the layer of the binder liquid from the transfer substrate side after the binder liquid and the recording medium are brought into contact with each other. The heat applied to the binder liquid melts the layer of the binder liquid on the transfer substrate to cause the binder liquid to easily function as an adhesive. In addition, the heat applied to the binder liquid facilitates the transfer of the image from the transfer substrate to the recording medium.

The method of applying heat from the transfer substrate side can be appropriately selected, and examples thereof include a method of heating using, for example, an iron. Alternatively, the liquid discharge apparatus 1 may perform the transfer process including heating.

In the transfer process, pressure may be applied to the transfer substrate and the recording medium. The pressure applied to the transfer substrate and the recording medium facilitates the transfer of the image from the transfer substrate to the recording medium.

It is preferable that the liquid discharge unit 9 discharges the white ink after a predetermined drying waiting time has elapsed from the discharge of the pretreatment liquid. In the discharge process, the white ink is preferably discharged after a predetermined drying waiting time has elapsed from the discharge of the pretreatment liquid.

The predetermined drying waiting time can prevent ink overflow in addition to bleeding which occurs when the adhesion amount of ink is too large. The drying waiting time can be appropriately determined according to, for example, the amount and type of the color ink or the white ink to be discharged, and the amount and type of the pretreatment liquid.

As described above, the liquid discharge apparatus 1 and the printing method according to the present embodiment can perform both the DTG method and the DTF method. The pretreatment liquid has a function of aggregating the white ink, similarly to the pretreatment liquid in a typical DTG printer. The binder liquid has a function of bonding the color ink layer or the white ink layer to the recording medium, similarly to an adhesive (powder) used in typical printing by the DTF method. Accordingly, the liquid discharge apparatus 1 according to the present embodiment can perform both the printing by the DTG method and the printing by the DTF method.

In the printing by the DTG method, for example, an image is directly formed on a garment, and thus the texture of the image is unlikely to be impaired. In the DTG method, when the white ink is used, the pretreatment liquid is discharged onto the recording medium and dried if desired. The pretreatment liquid can aggregate the white ink, and thus the pigment of the white ink can remain on the surface of a cloth. As a result, coloring of ink can be enhanced. In the printing by the DTF method, the amount of ink used can be reduced. The printing method can be selected according to the purpose.

As the transfer substrate, a non-permeable substrate can be suitably used. The non-permeable substrate refers to a substrate having a surface with a low level of moisture permeability and absorptivity. Examples thereof include a material having a number of hollow spaces inside but not open to the exterior. To be more quantitative, the non-permeable substrate refers to a substrate that absorbs water in an amount of 10 $mL/m^2$ or less in a period from the start of contact to 30 $msec^{1/2}$, when measured according to the Bristow method.

Specific preferred examples of the non-permeable substrate include, but are not limited to, plastic films such as vinyl chloride resin films, polyethylene terephthalate (PET) films, polypropylene films, polyethylene films, and polycarbonate films. As the recording medium, a cloth can be suitably used. Examples of the cloth include a fabric for a garment such as T-shirt. The recording medium may be paper instead of a cloth.

The color ink and the white ink are not limited to a particular type, and can be appropriately selected. For example, an aqueous pigment ink can be used. The pretreatment liquid has a function of aggregating the white ink. A known pretreatment liquid can be used, and a pretreatment liquid used in a typical DTG method can be used.

The binder liquid has a function of adhering the color ink or the white ink to the recording medium. A known binder liquid (which may be referred to as, for example, an adhesive, an adhesive liquid, or powder) used in the DTF method can be used. The component contained in the binder liquid can be selected as appropriate, and examples thereof include polyurethane.

A hot-melt binder may be used as the binder liquid. After the binder liquid is discharged to the transfer substrate, heat is applied to the transfer substrate to solidify the binder liquid, and thus the transfer sheet having an image which is not collapsed can be formed.

The binder liquid is preferably applied uniformly onto the transfer substrate. If the amount of the binder liquid varies depending on positions on the transfer substrate, the adhesive force varies depending on the positions, and an image, which is formed of the color ink and the white ink, adhered to a recording medium may be peeled off from a position having a weak adhesive force. Accordingly, the binder liquid is uniformly applied to the portion of the transfer substrate to which the binder liquid is to be applied. As a result, the adhesive force can be prevented from varying, and the color ink or the white ink can be prevented from being peeled off from the recording medium.

Figure 5:
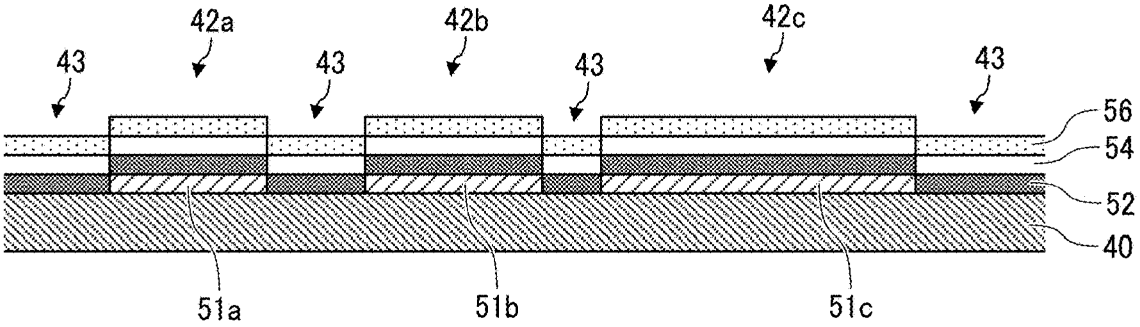
FIG. 5 is a schematic diagram illustrating an image formed on a transfer substrate by a DTF method according to an embodiment of the present disclosure.

FIG. 5 is a diagram illustrating the order of discharge in the printing by the DTF method. In the printing by the DTF method, the liquid and the ink are discharged onto a transfer substrate 40 placed on the platen 3. In the present embodiment, the transfer substrate 40 is a PET film for the DTF method. In the present embodiment, the color ink, the pretreatment liquid, the white ink, and the binder liquid are discharged in this order onto an image forming region of the transfer substrate 40.

As illustrated in FIG. 5, layers of color inks 51, a pretreatment liquid 52, a white ink 54, and a binder liquid 56 are formed on the transfer substrate 40. The color inks are represented by, but not limited to, reference numerals 51*a*, 51*b*, and 51*c* in FIG. 5. For example, the color ink 51*a* may be yellow ink, the color ink 51*b* may be magenta ink, and the color ink 51*c* may be cyan ink. When the types of the color inks are described without distinction, each of the color inks 51*a*, 51*b*, and 51*c* is referred to as, for example, a color ink 51.

The color ink 51 is discharged onto an image forming region 42. Specifically, the color inks 51*a* to 50*c* are discharged onto image forming regions 42*a* to 42*c*, respectively. When the types of color inks are described without distinction, each of the image forming regions 42*a*, 42*b*, and 42*c* is referred to as, for example, an image forming region 42. The image forming region 42 is a region onto which the color ink 51 is discharged. In the present embodiment, since the white ink 54 is discharged onto the region onto which the color ink 51 has been discharged, the image forming region 42 is also a region onto which both the color ink 51 and the white ink 54 are discharged.

A non-image forming region 43 is a region onto which the color ink 51 is not discharged. In the present embodiment, the white ink 54 may be discharged onto the non-image forming region 43. When the white ink 54 is discharged onto the non-image forming region 43, the pretreatment liquid 52, the white ink 54, and the binder liquid 56 are discharged.

In the printing by the DTF method, an image is printed with the color ink 51 and the white ink 54 on the transfer substrate 40 based on image data inverted to a mirror image. The mirror image printed on the transfer substrate 40 is transferred to a recording medium to form a normal image based on the image data on the recording medium.

The appropriate adhesion amount of the pretreatment liquid 52 varies depending on the amount of the color ink 51 and the white ink 54 to be discharged. Accordingly, the pretreatment liquid 52 is discharged to each position in an amount suitable for the pretreatment liquid 52 to aggregate the white ink 54. The binder liquid 56 is discharged to the region onto which at least one of the color ink 51 or the white ink 54 is discharged.

The color ink 51, the pretreatment liquid 52, the white ink 54, and the binder liquid 56 are discharged in this order onto the transfer substrate 40 to form an image on the transfer substrate 40. As illustrated in FIG. 5, the transfer substrate 40 on which an image is formed may be referred to as, for example, a transfer sheet or a transfer medium. The transfer sheet is brought into contact with a recording medium, and heat is applied if desired, to transfer the image from the transfer substrate 40 to the recording medium.

The arrangement of the heads in the liquid discharge apparatus 1 according to the present embodiment will be described below. For example, when the liquid discharge apparatus 1 has two carriages as illustrated in FIG. 3, the pretreatment liquid and the binder liquid are stored in the carriage on the back side (carriage 10B), and the color ink and the white ink are stored in the carriage on the front side (carriage 10A). However, embodiments of the present disclosure are not limited to such a configuration, and the configuration of the liquid discharge apparatus can be appropriately changed.

Figure 6:
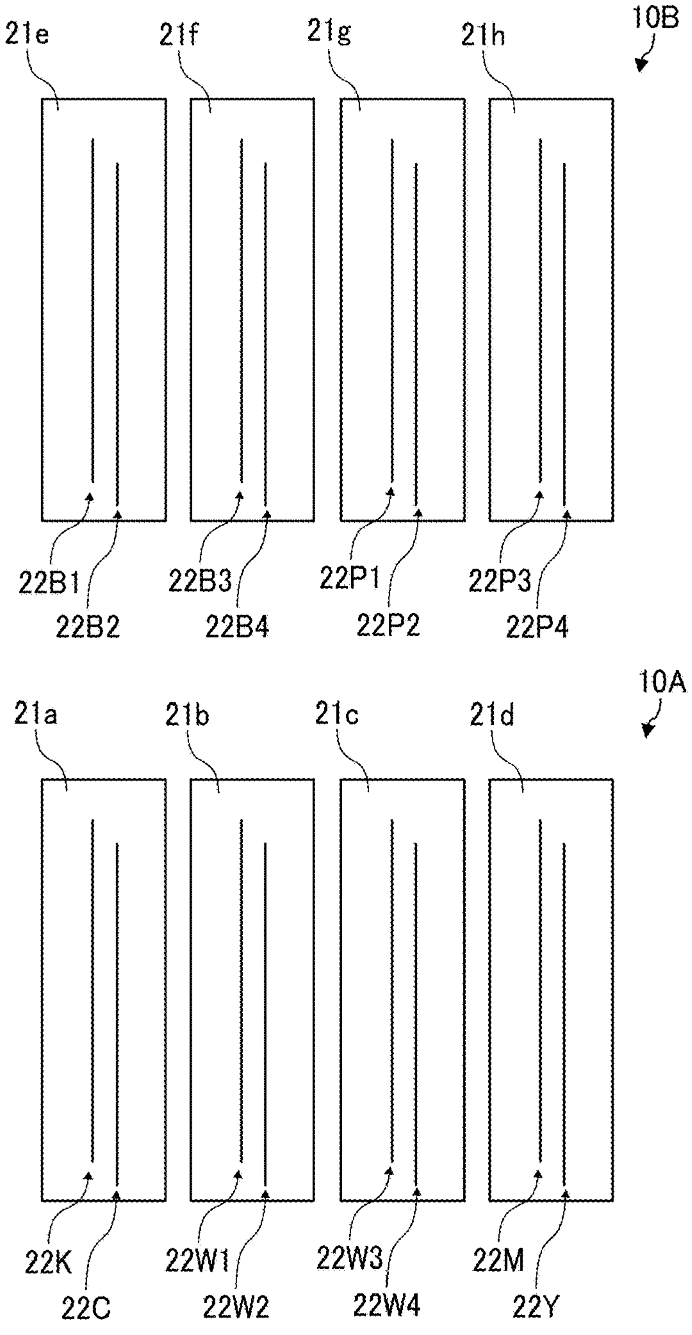
FIG. 6 is a plan view of liquid discharge heads according to an embodiment of the present disclosure.

FIG. 6 is a schematic plan view of the carriages 10A and 10B in the liquid discharge apparatus 1 of FIG. 3, illustrating the arrangement of the heads and the assignment of ink and liquid. However, in the liquid discharge apparatus 1 according to an embodiment of the present disclosure, the number of carriages is not limited to two, and can be appropriately changed. The arrangement and number of heads are not limited to the example illustrated in FIG. 6, and can be appropriately changed.

In the example illustrated in FIG. 6, four heads 21*a* to 21*d* are mounted on the carriage 10A, and four heads 21*e* to 21*h* are mounted on the carriage 10B. In the example illustrated in FIG. 6, one head 21 has two nozzle rows 22, but embodiments of the present disclosure are not limited thereto, and the number of nozzle rows 22 in one head 21 can be appropriately changed. When the heads are described without distinction, the heads are referred to as, for example, heads 21, each of which is referred to as a head 21. When the nozzle rows are described without distinction, the nozzle rows are referred to as, for example, nozzle rows 22, each of which is referred to as a nozzle row 22.

The heads 21*a* to 21*d* in the carriage 10A according to the present embodiment are described below. The head 21*a* includes a nozzle row 22K for discharging black color ink and a nozzle row 22C for discharging cyan color ink. The head 21*b* includes a nozzle row 22W1 for discharging the white ink and a nozzle row 22W2 for discharging the white ink. The head 21*c* includes a nozzle row 22W3 for discharging the white ink and a nozzle row 22W4 for discharging the white ink. The head 21*d* includes a nozzle row 22M for discharging magenta color ink and a nozzle row 22Y for discharging yellow color ink.

The heads 21*e* to 21*h* in the carriage 10B according to the present embodiment are described below. The head 21*e* includes a nozzle row 22B1 for discharging the binder liquid and a nozzle row 22B2 for discharging the binder liquid. The head 21*f* includes a nozzle row 22B3 for discharging the binder liquid and a nozzle row 22B4 for discharging the binder liquid. The head 21*g* includes a nozzle row 22P1 for discharging the pretreatment liquid and a nozzle row 22P2 for discharging the pretreatment liquid. The head 21*h* includes a nozzle row 22P3 for discharging the pretreatment liquid and a nozzle row 22P4 for discharging the pretreatment liquid.

The type and number of the color inks to be discharged are not limited to the example illustrated in FIG. 6. The type of color ink is not limited to black (K), cyan (C), magenta (M), and yellow (Y). The number of color inks may be one. The number of nozzle rows for discharging the white ink is not limited to the example illustrated in FIG. 6. The number of nozzle rows for discharging the binder liquid is not limited to the example illustrated in FIG. 6, and the number of nozzle rows for discharging the pretreatment liquid is not limited to the example illustrated in FIG. 6.

In the example illustrated in FIG. 6, each of the white ink, the pretreatment liquid, and the binder liquid is discharged from two heads, but embodiments of the present disclosure are not limited thereto. For example, the carriage 10A may include one head for discharging the white ink and three heads for discharging the binder liquid instead. The arrangement of the head is appropriately changed in consideration of, for example, the discharge amount.

In the DTF method, the platen 3 moves between the discharge region of the carriage 10A and the discharge region of the carriage 10B. For example, the color ink is discharged onto a substrate on the platen 3 from the carriage 10A, then the pretreatment liquid is discharged onto the substrate from the carriage 10B, then the white ink is discharged onto the substrate from the carriage 10A, and then the binder liquid is discharged onto the substrate from the carriage 10B. By so doing, for example, as illustrated in FIG. 5, each liquid and each ink can be discharged onto the substrate.

The liquid discharge unit according to the present embodiment includes a nozzle from which color ink is dischargeable, a nozzle from which white ink is dischargeable, a nozzle from which a treatment liquid is dischargeable, and a nozzle from which a binder liquid is dischargeable. As in the above example, a case where the liquid discharge head (may be referred to simply as, for example, a head) has a nozzle is also included in a case where the liquid discharge unit has a nozzle.

Figure 7:
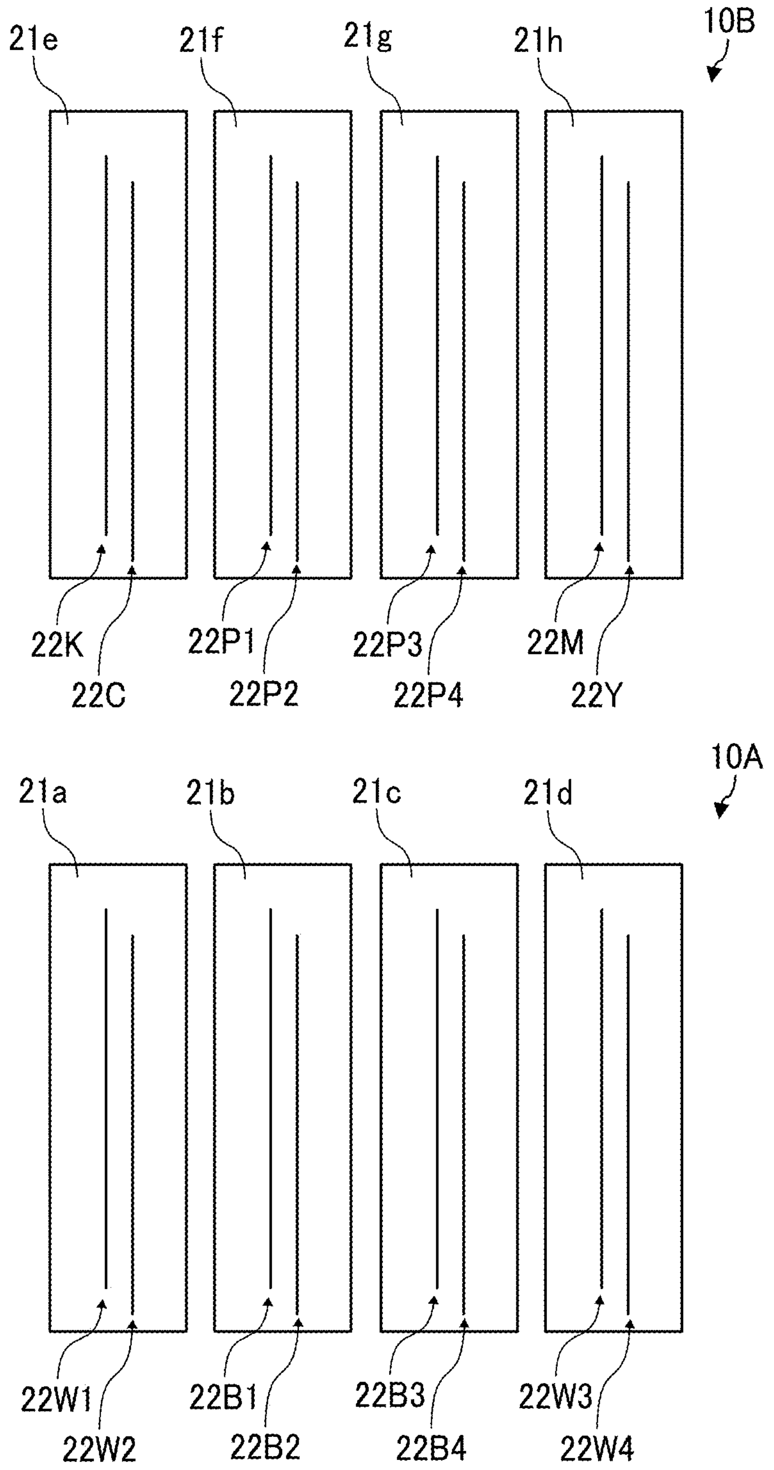
FIG. 7 is a plan view of liquid discharge heads according to another embodiment of the present disclosure.

Another example of the arrangement of the heads will be described below. FIG. 7 is a schematic plan view of the carriages 10A and 10B in the liquid discharge apparatus 1 of FIG. 3, illustrating another arrangement of the heads and another assignment of ink and liquid.

The heads 21*a* to 21*d* in the carriage 10A according to the present embodiment are described below. The head 21*a* includes the nozzle row 22W1 for discharging the white ink and the nozzle row 22W2 for discharging the white ink. The head 21*b* includes the nozzle row 22B1 for discharging the binder liquid and the nozzle row 22B2 for discharging the binder liquid. The head 21*c* includes the nozzle row 22B3 for discharging the binder liquid and the nozzle row 22B4 for discharging the binder liquid. The head 21*d* includes the nozzle row 22W3 for discharging the white ink and the nozzle row 22W4 for discharging the white ink.

The heads 21*e* to 21*h* in the carriage 10B according to the present embodiment are described below. The head 21*e* includes the nozzle row 22K for discharging the black color ink and the nozzle row 22C for discharging the cyan color ink. The head 21*f* includes the nozzle row 22P1 for discharging the pretreatment liquid and the nozzle row 22P2 for discharging the pretreatment liquid. The head 21*g* includes the nozzle row 22P3 for discharging the pretreatment liquid and the nozzle row 22P4 for discharging the pretreatment liquid. The head 21*h* includes the nozzle row 22M for discharging the magenta color ink and the nozzle row 22Y for discharging the yellow color ink.

In the DTF method, the platen 3 moves between the discharge region of the carriage 10A and the discharge region of the carriage 10B. For example, the color ink is discharged onto a transfer substrate on the platen 3 from the carriage 10B, then the pretreatment liquid is discharged onto the transfer substrate from the carriage 10B, then the white ink is discharged onto the transfer substrate from the carriage 10A, and then the binder liquid is discharged onto the transfer substrate from the carriage 10A. By so doing, for example, as illustrated in FIG. 5, each liquid and each ink can be discharged onto the transfer substrate.

Figure 8A:
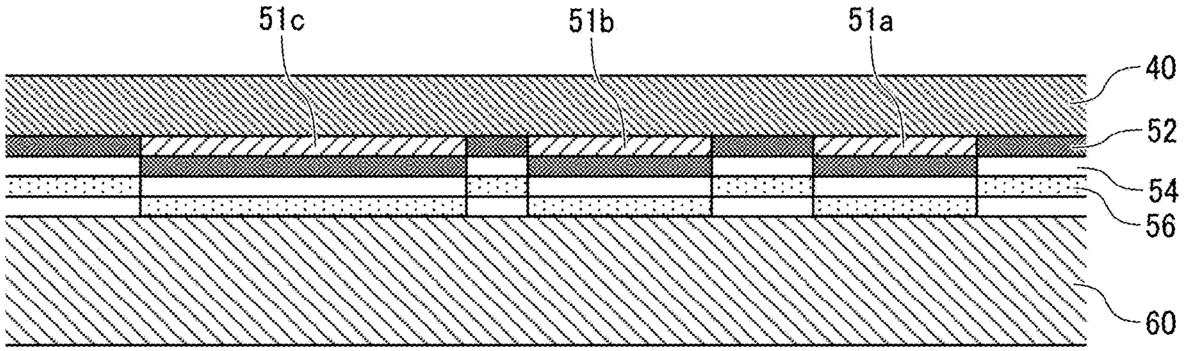
FIGS. 8A and 8B are schematic diagrams illustrating a transfer process.
Figure 8B:
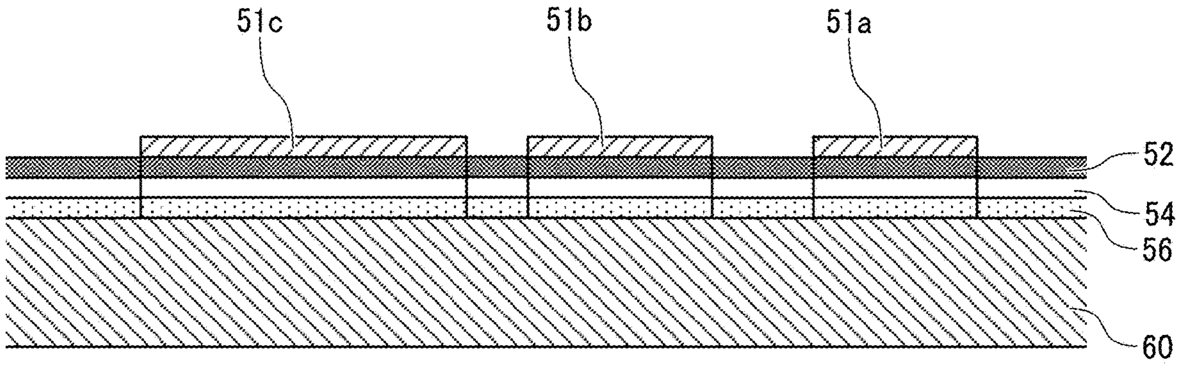

FIGS. 8A and 8B are schematic diagrams illustrating a transfer process of transferring an image on a transfer substrate to a recording medium. FIG. 8A is a diagram schematically illustrating the transfer substrate 40 and a recording medium 60. The transfer substrate 40 on which an image is formed is brought into contact with the recording medium 60 after the first method is performed. As illustrated in FIG. 8A, the binder liquid 56 on the transfer substrate 40 is brought into contact with the recording medium 60. As described above, heat is preferably applied to the binder liquid 56 from the transfer substrate 40 side (from the upper side in FIG. 8A).

FIG. 8B is a diagram schematically illustrating the recording medium 60. The transfer substrate 40 is peeled off from the recording medium 60, and thus the image is transferred to the recording medium 60. According to the present embodiment, a high-quality image can be formed on the recording medium 60.

Aspects of the present disclosure are, for example, as follows.

Aspect 1

A liquid discharge apparatus can perform a first method of forming an image on a transfer substrate for transferring an image to a recording medium and a second method of forming an image on a recording medium. The liquid discharge apparatus includes a liquid discharge unit including a color ink, a white ink, a pretreatment liquid containing a coagulant, and a binder liquid containing a resin, and a nozzle for discharging the color ink, a nozzle for discharging the white ink, a nozzle for discharging the pretreatment liquid, and a nozzle for discharging the binder liquid. The liquid discharge unit discharges the pretreatment liquid when the first method is performed.

In other words, a liquid discharge apparatus includes a first head, a second head, and a third head. The first head discharges a color ink onto a transfer substrate. The second head discharges a pretreatment liquid including a coagulant onto the transfer substrate onto which the color ink has been discharged by the first head. The third head discharges a white ink onto the transfer substrate onto which the pretreatment liquid has been discharged by the second head. The liquid discharge apparatus further includes a fourth head to discharge a binder liquid including a resin onto the transfer substrate onto which the white ink has been discharged by the third head.

Aspect 2

In the liquid discharge apparatus according to Aspect 1, the liquid discharge unit discharges the color ink, the pretreatment liquid, the white ink, and the binder liquid in this order onto an image forming region of the transfer substrate when the first method is performed, and discharges the pretreatment liquid, the white ink, and the color ink in this order onto an image forming region of the recording medium when the second method is performed.

In other words, the second head discharges the pretreatment liquid including the coagulant onto a recording medium. The third head discharges the white ink onto the recording medium onto which the pretreatment liquid has been discharged by the second head. The first head discharges the color ink onto the recording medium onto which the white ink has been discharged by the third head.

Aspect 3

In the liquid discharge apparatus according to Aspect 1 or 2, the transfer substrate is a non-permeable substrate, and the recording medium is a cloth.

In other words, the first head discharges the color ink, the second head discharges the pretreatment liquid, and the third head discharges the white ink, onto the transfer substrate including a non-permeable substrate, or the second head discharges the pretreatment liquid, the third head discharges the white ink, and the first head discharges the color ink, onto the recording medium including a cloth.

Aspect 4

In the liquid discharge apparatus according to Aspect 2, the liquid discharge unit discharges the white ink after a predetermined drying waiting time has elapsed from the discharge of the pretreatment liquid.

In other words, the third head discharges the white ink onto the transfer substrate after an elapse of a predetermined drying time from a discharge of the pretreatment liquid by the second head, or the third head discharges the white ink onto the recording medium after an elapse of a predetermined drying time from a discharge of the pretreatment liquid by the second head.

Aspect 5

A printing method can perform a first method of forming an image on a transfer substrate for transferring an image to a recording medium and a second method of forming an image on a recording medium. The first method and the second method include a discharge process of discharging a color ink, a white ink, a pretreatment liquid containing a coagulant, and a binder liquid containing a resin by a liquid discharge unit. The discharge process includes discharging the pretreatment liquid when the first method is performed.

In other words, a printing method includes discharging a color ink onto a transfer substrate, discharging a pretreatment liquid including a coagulant onto the transfer substrate onto which the color ink has been discharged, and discharging a white ink onto the transfer substrate onto which the pretreatment liquid has been discharged. The printing method further includes discharging a binder liquid including a resin onto the transfer substrate onto which the white ink has been discharged.

Aspect 6

In the discharge process of the printing method according to Aspect 5, the color ink, the pretreatment liquid, the white ink, and the binder liquid are discharged in this order onto an image forming region of the transfer substrate when the first method is performed, and the pretreatment liquid, the white ink, and the color ink are discharged in this order onto an image forming region of the recording medium when the second method is performed.

In other words, the printing method according to Aspect 5 further includes discharging the pretreatment liquid including the coagulant onto a recording medium, discharging the white ink onto the recording medium onto which the pretreatment liquid has been discharged, and discharging the color ink onto the recording medium onto which the white ink has been discharged.

Aspect 7

The printing method according to Aspect 6, further includes a transfer process of transferring the color ink and/or the white ink on the transfer substrate to the recording medium after the first method is performed. The transfer process includes bringing the binder liquid on the transfer substrate into contact with the recording medium to transfer the color ink and/or the white ink on the transfer substrate to the recording medium.

In other words, the printing method according to Aspect 5, further includes bringing the binder liquid on the transfer substrate into contact with a recording medium to transfer at least one of the color ink or the white ink on the transfer substrate to the recording medium.

Aspect 8

In the printing method according to Aspect 7, the transfer process includes applying heat from the transfer substrate side after the binder liquid and the recording medium are brought into contact with each other.

In other words, the printing method according to Aspect 7, further includes applying heat to the binder liquid through the transfer substrate after the bringing the binder liquid on the transfer substrate into contact with the recording medium.

Aspect 9

In the printing method according to Aspect 5, the transfer substrate is a non-permeable substrate, and the recording medium is a cloth.

In other words, the discharging the color ink, the discharging the pretreatment liquid, and the discharging the white ink include discharging onto the transfer substrate including a non-permeable substrate, or the discharging the pretreatment liquid, the discharging the white ink, and the discharging the color ink include discharging onto the recording medium including a cloth.

Aspect 10

In the printing method according to Aspect 6, the discharge process includes discharging the white ink after a predetermined drying waiting time has elapsed from the discharge of the pretreatment liquid.

In other words, the the discharging the white ink includes discharging the white ink onto the transfer substrate after an elapse of a predetermined drying time from a discharge of the pretreatment liquid, or the the discharging the white ink includes discharging the white ink onto the recording medium after an elapse of a predetermined drying time from a discharge of the pretreatment liquid.

According to one aspect of the present disclosure, a liquid discharge apparatus can be provided that performs the printing by the DTF method and the printing by the DTG method. The liquid discharge apparatus can prevent the white ink from bleeding into the color ink and prevent an image from being blurred in white when the printing by the DTF method is performed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A liquid discharge apparatus, comprising:

a first head to discharge a color ink onto a transfer substrate;

a second head to discharge a pretreatment liquid including a coagulant onto the transfer substrate onto which the color ink has been discharged by the first head;

a third head to discharge a white ink onto the transfer substrate onto which the pretreatment liquid has been discharged by the second head;

a fourth head to discharge a binder liquid including a resin onto the transfer substrate onto which the white ink has been discharged by the third head; and processing circuitry configured to control the first head, the second head, the third head and the fourth head to perform a first printing process or a second printing process, wherein in the first printing process, an image is formed on the transfer substrate from which the image is to be transferred to a recording medium, and in the second printing process, the image is formed directly on the recording medium.

2. The liquid discharge apparatus according to claim 1, wherein the first head discharges the color ink, the second head discharges the pretreatment liquid, and the third head discharges the white ink, onto the transfer substrate including a non-permeable substrate.

3. The liquid discharge apparatus according to claim 1, wherein the third head discharges the white ink onto the transfer substrate after an elapse of a predetermined drying time from a discharge of the pretreatment liquid by the second head.

4. The liquid discharge apparatus according to claim 1, wherein the second head discharges the pretreatment liquid including the coagulant onto a recording medium;

the third head discharges the white ink onto the recording medium onto which the pretreatment liquid has been discharged by the second head; and the first head discharges the color ink onto the recording medium onto which the white ink has been discharged by the third head.

5. The liquid discharge apparatus according to claim 4, wherein the second head discharges the pretreatment liquid, the third head discharges the white ink, and the first head discharges the color ink, onto the recording medium including a cloth.

6. The liquid discharge apparatus according to claim 4, wherein the third head discharges the white ink onto the recording medium after an elapse of a predetermined drying time from a discharge of the pretreatment liquid by the second head.

7. The liquid discharge apparatus according to claim 1, wherein after the binder liquid on the transfer substrate is brought into contact with the recording medium, the binder liquid is heated via the transfer substrate to melt the binder liquid to transfer the image to the recording medium.

8. The liquid discharge apparatus according to claim 1, wherein the binder liquid is heated and solidified.

9. The liquid discharge apparatus according to claim 1, wherein the transfer substrate is the non-absorptive substrate that absorbs water in an amount of 10 mL/m2 or less in a period from the start of contact to 30 msec1/2, when measured according to the Bristow method.

10. A printing method, comprising:

discharging a color ink onto a transfer substrate;

discharging a pretreatment liquid including a coagulant onto the transfer substrate onto which the color ink has been discharged;

discharging a white ink onto the transfer substrate onto which the pretreatment liquid has been discharged;

discharging a binder liquid including a resin onto the transfer substrate onto which the white ink has been discharged; and selectively performing a first printing process or a second printing process, wherein in the first printing process, an image is formed on the transfer substrate from which the image is to be transferred to a recording medium, and in the second printing process, the image is formed directly on the recording medium.

11. The printing method according to claim 10, further comprising bringing the binder liquid on the transfer substrate into contact with a recording medium to transfer at least one of the color ink or the white ink on the transfer substrate to the recording medium.

12. The printing method according to claim 11, further comprising applying heat to the binder liquid through the transfer substrate after the bringing the binder liquid on the transfer substrate into contact with the recording medium.

13. The printing method according to claim 10, wherein the discharging the color ink, the discharging the pretreatment liquid, and the discharging the white ink include discharging onto the transfer substrate including a non-permeable substrate.

14. The printing method according to claim 10, wherein the discharging the white ink includes discharging the white ink onto the transfer substrate after an elapse of a predetermined drying time from a discharge of the pretreatment liquid.

15. The printing method according to claim 10, further comprising:

discharging the pretreatment liquid including the coagulant onto a recording medium;

discharging the white ink onto the recording medium onto which the pretreatment liquid has been discharged; and discharging the color ink onto the recording medium onto which the white ink has been discharged.

16. The printing method according to claim 15, wherein the discharging the pretreatment liquid, the discharging the white ink, and the discharging the color ink include discharging onto the recording medium including a cloth.

17. The printing method according to claim 15, wherein the discharging the white ink includes discharging the white ink onto the recording medium after an elapse of a predetermined drying time from a discharge of the pretreatment liquid.

* * * * *